(12) United States Patent (10) Patent No.: US 8,309,478 B2
Nair et al. (45) Date of Patent: *Nov. 13, 2012

(54) CONSOLIDATED FIBROUS STRUCTURE

(75) Inventors: Sujith Nair, Greer, SC (US); Sasha Stankovich, Spartanburg, SC (US); Yunzhang Wang, Duncan, SC (US); Venkatkrishna Raghavendran, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/307,151

(22) Filed: Nov. 30, 2011

(65) Prior Publication Data

US 2012/0071054 A1 Mar. 22, 2012

Related U.S. Application Data

(63) Continuation of application No. 12/360,553, filed on Jan. 27, 2009, now Pat. No. 8,119,549.

(51) Int. Cl.
*D04H 1/00* (2006.01)
*D04H 3/00* (2006.01)
*D04H 5/00* (2006.01)
*D02G 3/00* (2006.01)

(52) U.S. Cl. ......... 442/364; 442/361; 428/373; 428/378

(58) Field of Classification Search .......... 442/400–401, 442/361–364; 428/296.7, 297.1, 373–378
See application file for complete search history.

(56) References Cited

U.S. PATENT DOCUMENTS

| | | | |
|---|---|---|---|
| 3,338,778 A | 8/1967 | Hutchins et al. | 161/226 |
| 3,836,607 A | 9/1974 | Finkman et al. | 260/897 |
| 3,900,534 A | 8/1975 | Schard | 260/897 |
| 4,075,290 A | 2/1978 | Denzel et al. | 260/897 |
| 4,178,272 A | 12/1979 | Meyer, Jr. et al. | 260/27 R |
| 4,184,993 A | 1/1980 | Singh et al. | 260/31.2 RR |
| 4,252,851 A | 2/1981 | Lansbury et al. | 428/336 |
| 4,309,487 A | 1/1982 | Holmes | 428/516 |
| 4,403,012 A | 9/1983 | Harpell et al. | 428/290 |
| 4,650,710 A | 3/1987 | Harpell et al. | 428/263 |

(Continued)

FOREIGN PATENT DOCUMENTS

EP 0 264 112 4/1988

(Continued)

OTHER PUBLICATIONS

Patent Cooperation Treaty PCT International Search Report. Date of Mailing, Apr. 15, 2010, International Application No. PCT/US2009/006664, International Filing Date, Dec. 21, 2009.

*Primary Examiner* — Lynda Salvatore

(74) *Attorney, Agent, or Firm* — Cheryl J. Brickey

(57) ABSTRACT

A consolidated fibrous structure including a multiplicity of fibrous layers. Each fibrous layer comprises tape fibers, wherein the tape fibers contain a polypropylene core and a skin layer. At least a portion of the skin layers of the fibers in each fibrous layer are fused to at least a portion of other skin layers of fibers within the same fibrous layer and at least a portion of the skin layers of the fibers of each fibrous layer are fused with at least a portion of the skin layers of the fibers in an adjacent fibrous layer.

10 Claims, 9 Drawing Sheets

U.S. PATENT DOCUMENTS

| | | | | |
|---|---|---|---|---|
| 4,962,248 | A | 10/1990 | Winter et al. | 585/12 |
| 5,004,635 | A | 4/1991 | Griebling | 428/33 |
| 5,023,388 | A | 6/1991 | Liiker | 585/9 |
| 5,036,140 | A | 7/1991 | Hwo | 525/222 |
| 5,049,426 | A | 9/1991 | Kimura et al. | 428/36.2 |
| 5,126,198 | A | 6/1992 | Schinkel et al. | 428/349 |
| 5,206,079 | A | 4/1993 | Sanada et al. | 428/252 |
| 5,484,824 | A | 1/1996 | Abe et al. | 523/436 |
| 5,530,065 | A | 6/1996 | Farley et al. | 525/240 |
| 5,674,600 | A | 10/1997 | Hargarter et al. | 428/212 |
| 5,811,186 | A | 9/1998 | Martin et al. | 428/373 |
| 6,045,923 | A | 4/2000 | Kok et al. | 428/517 |
| 6,126,780 | A | 10/2000 | Benzing, II et al. | 156/406.4 |
| 6,156,679 | A | 12/2000 | Takaoka et al. | 442/327 |
| 6,268,062 | B1 | 7/2001 | Demeuse | 428/461 |
| 6,287,700 | B1 | 9/2001 | Kong et al. | 428/447 |
| 6,417,122 | B1 * | 7/2002 | Newkirk et al. | 442/364 |
| 6,458,469 | B1 | 10/2002 | DeLisio et al. | 428/516 |
| 6,599,639 | B2 | 7/2003 | Dayrit et al. | 428/475.8 |
| 6,620,897 | B1 | 9/2003 | Smillie | 526/171 |
| 6,638,637 | B2 | 10/2003 | Hager et al. | 428/516 |
| 6,689,517 | B1 | 2/2004 | Kaminsky et al. | 430/11 |
| 6,777,502 | B2 | 8/2004 | Ho et al. | 525/332.6 |
| 6,800,692 | B2 | 10/2004 | Farley et al. | 525/191 |
| 6,824,863 | B1 | 11/2004 | Kitayama et al. | 428/299.7 |
| 6,887,582 | B2 | 5/2005 | Lee et al. | 428/516 |
| 6,916,882 | B2 | 7/2005 | Bryant | 525/191 |
| 6,939,919 | B2 | 9/2005 | Tau et al. | 525/191 |
| 6,960,392 | B2 | 11/2005 | Le Du et al. | 428/461 |
| 6,979,495 | B2 | 12/2005 | Keung et al. | 428/476.1 |
| 7,094,456 | B1 | 8/2006 | Vargo et al. | 428/61 |
| 7,147,930 | B2 | 12/2006 | Schell et al. | 428/516 |
| 7,217,463 | B2 | 5/2007 | Henderson | 428/516 |
| 7,226,880 | B2 | 6/2007 | Potnis | 442/498 |
| 7,262,251 | B2 | 8/2007 | Kanderski et al. | 525/240 |
| 7,294,383 | B2 | 11/2007 | Callaway et al. | 428/86 |
| 7,294,384 | B2 | 11/2007 | Eleazer et al. | 428/86 |
| 7,300,691 | B2 | 11/2007 | Callaway et al. | 428/86 |
| 7,318,961 | B2 | 1/2008 | Loos et al. | 428/516 |
| 7,328,547 | B2 | 2/2008 | Mehta et al. | 53/428 |
| 7,390,575 | B2 | 6/2008 | Tayano et al. | 428/515 |
| 7,449,504 | B2 | 11/2008 | Richter et al. | 524/13 |
| 7,537,821 | B2 | 5/2009 | Kashima et al. | 428/174 |
| 7,960,024 | B2 | 6/2011 | Nair et al. | 428/373 |
| 8,029,633 | B2 | 10/2011 | Nair et al. | 156/167 |
| 8,114,507 | B2 | 2/2012 | Nair et al. | 428/296.7 |
| 8,119,549 | B2 | 2/2012 | Nair et al. | 442/373 |
| 8,133,537 | B2 | 3/2012 | Nair et al. | 427/261 |
| 8,147,957 | B2 | 4/2012 | Nair et al. | 428/374 |
| 2004/0112533 | A1 | 6/2004 | Va den Bossche et al. | 156/334 |
| 2004/0242103 | A1 | 12/2004 | Loos et al. | 442/185 |
| 2005/0222310 | A1 | 10/2005 | Richter | 524/275 |
| 2005/0256245 | A1 | 11/2005 | Lechner et al. | 524/487 |
| 2005/0288412 | A1 | 12/2005 | Hohner et al. | 524/384 |
| 2006/0074171 | A1 | 4/2006 | Bach et al. | 524/487 |
| 2006/0147685 | A1 | 7/2006 | Potnis et al. | 428/212 |
| 2006/0151104 | A1 | 7/2006 | Jacobs et al. | 156/308.2 |
| 2006/0183860 | A1 | 8/2006 | Mehta et al. | 525/191 |
| 2006/0204736 | A1 | 9/2006 | Carolis | 428/212 |
| 2006/0235134 | A1 | 10/2006 | Bach et al. | 524/487 |
| 2007/0071960 | A1 | 3/2007 | Eleazer et al. | 428/297.7 |
| 2007/0117894 | A1 | 5/2007 | Bach et al. | 524/270 |
| 2007/0135008 | A1 | 6/2007 | Hall et al. | 442/181 |
| 2008/0124513 | A1 | 5/2008 | Eleazer et al. | 428/113 |

FOREIGN PATENT DOCUMENTS

| | | |
|---|---|---|
| WO | WO 93/03093 | 2/1993 |
| WO | WO 98/29586 | 7/1998 |
| WO | WO 03/008190 | 1/2003 |
| WO | WO 2007/011038 | 1/2007 |
| WO | WO 2007/038000 | 4/2007 |
| WO | WO 2007/131958 | 11/2007 |
| WO | WO 2008/040506 | 4/2008 |
| WO | WO 2008/043468 | 4/2008 |
| WO | WO 2008/046535 | 4/2008 |

* cited by examiner

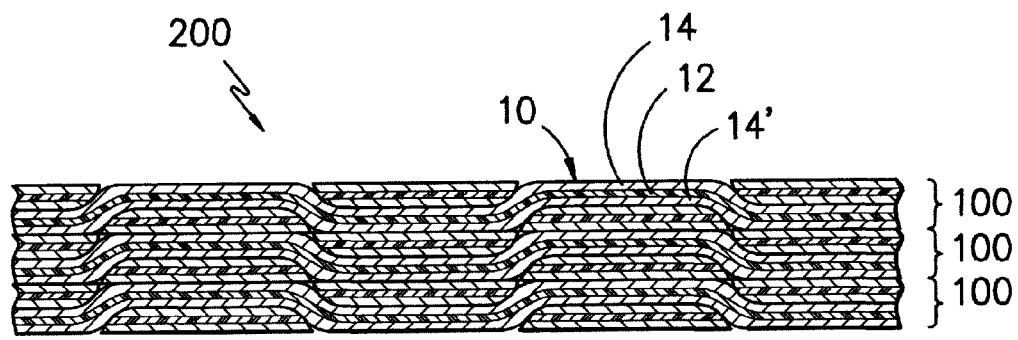
FIG. -1-
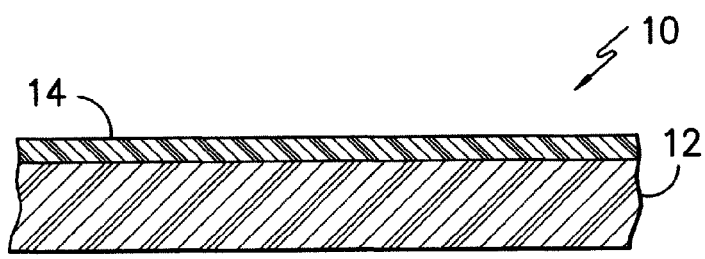
FIG. -2-
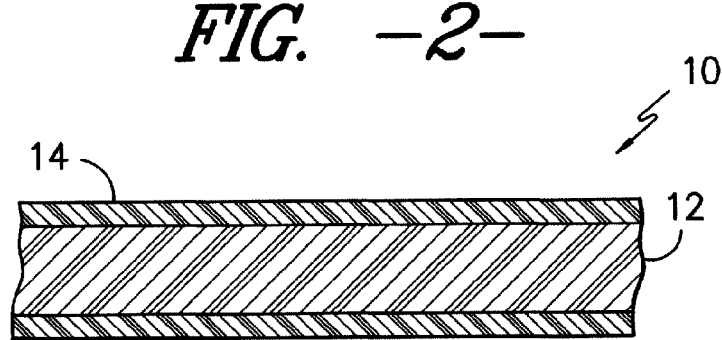
FIG. -3-
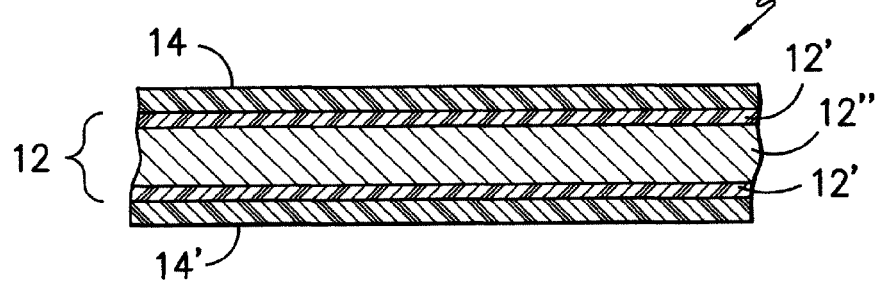
FIG. -4-

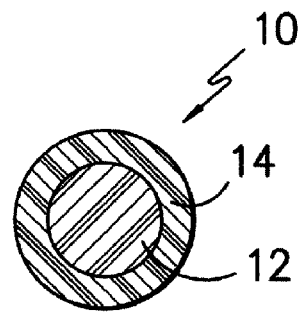
FIG. -5-
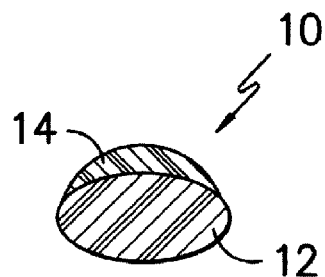
FIG. -6-
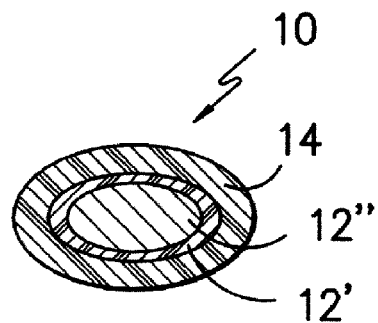
FIG. -7-

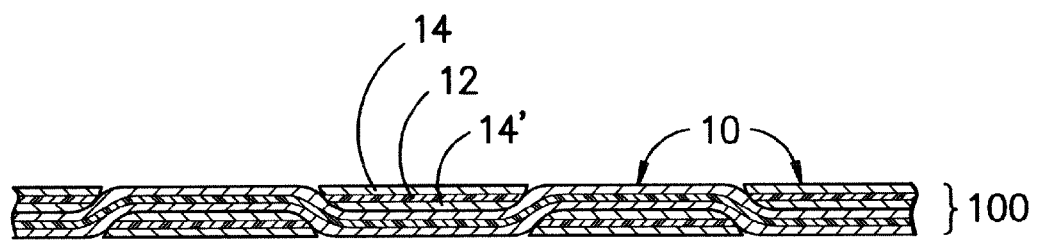
FIG. -8-
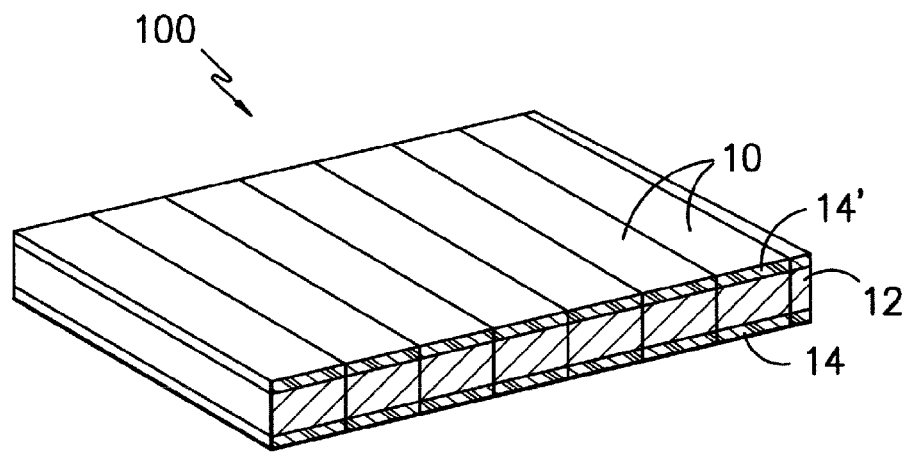
FIG. -9-

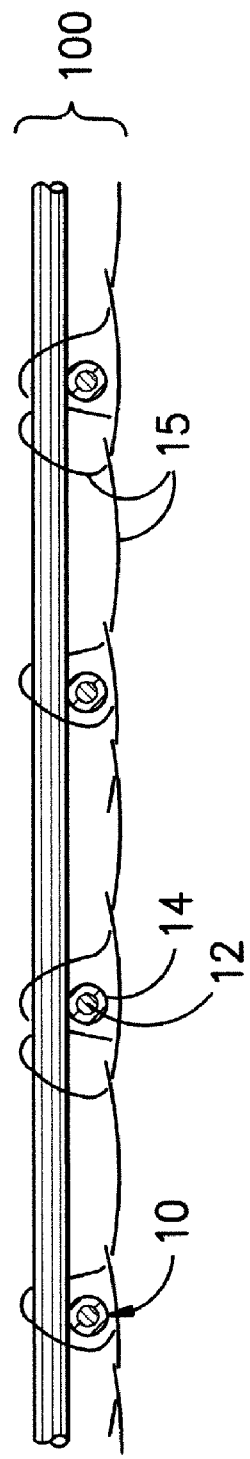
FIG. -10-
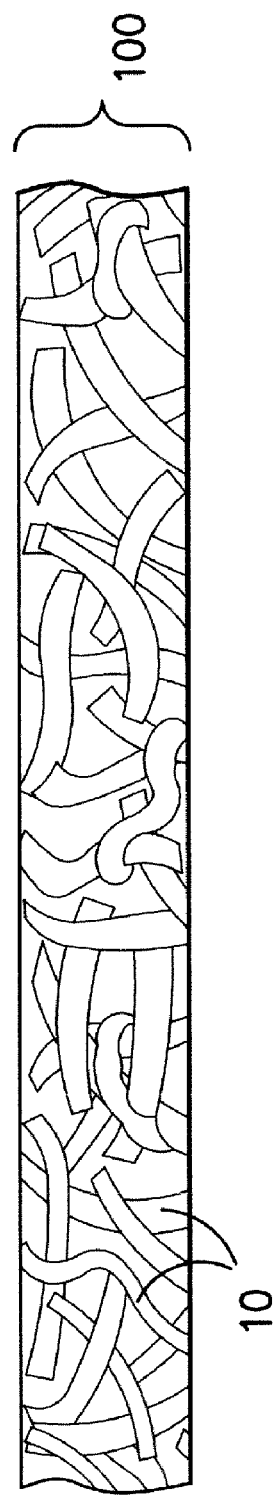
FIG. -11-

FIG. -12-
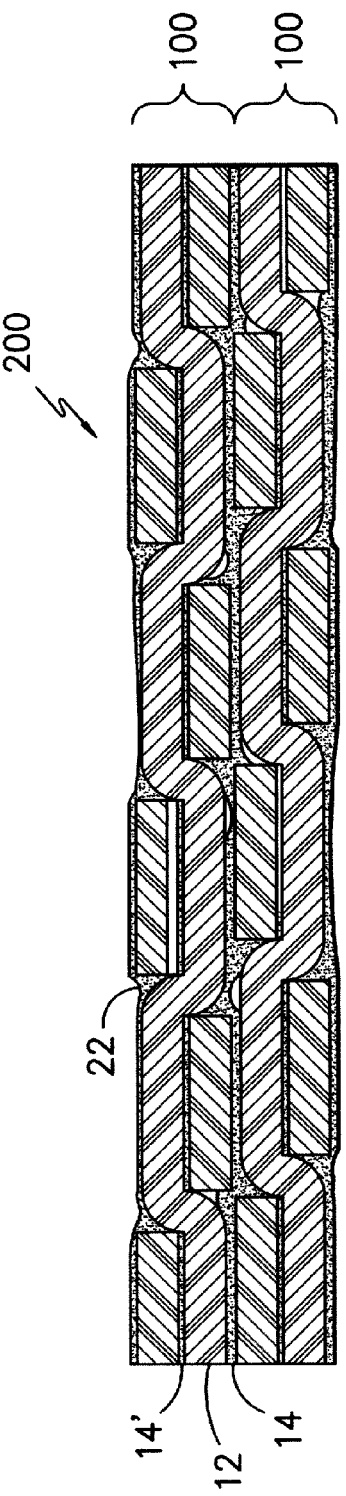
FIG. -13-

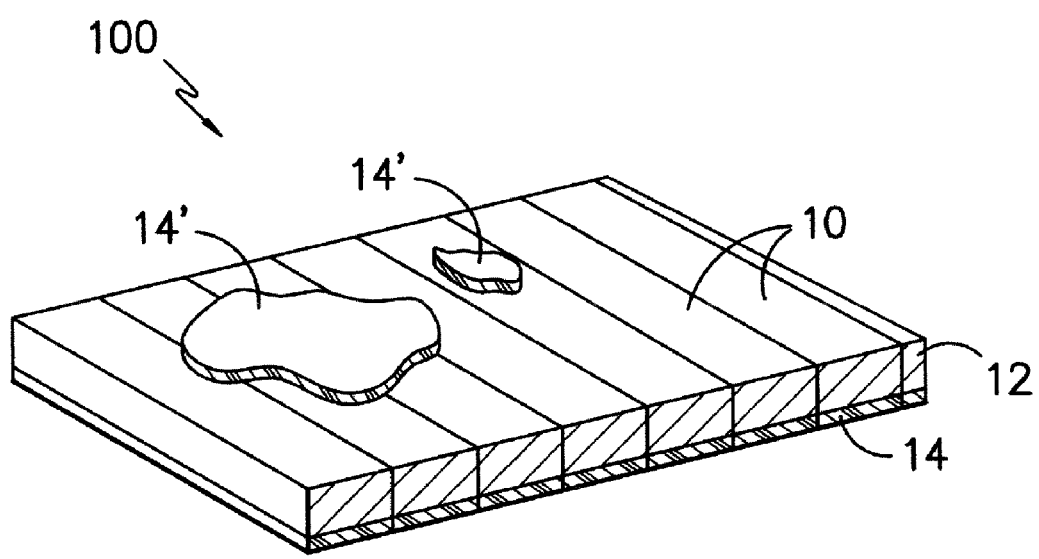
FIG. -14-

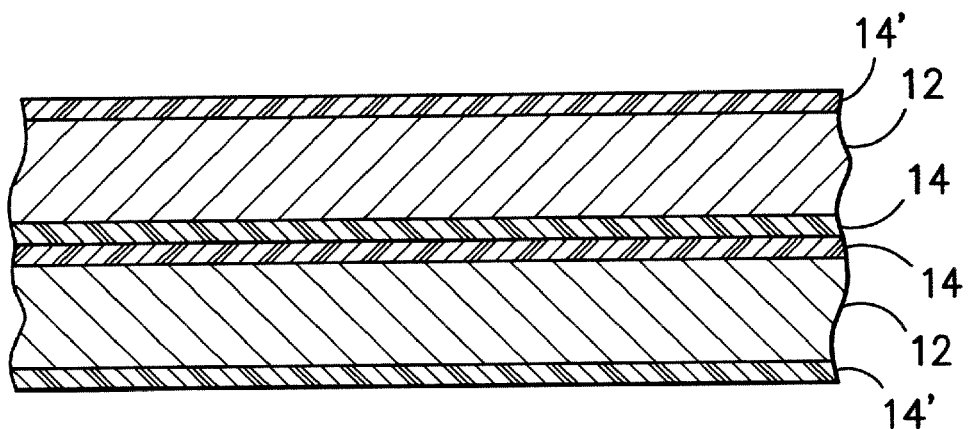
FIG. -15-
FIG. -16-

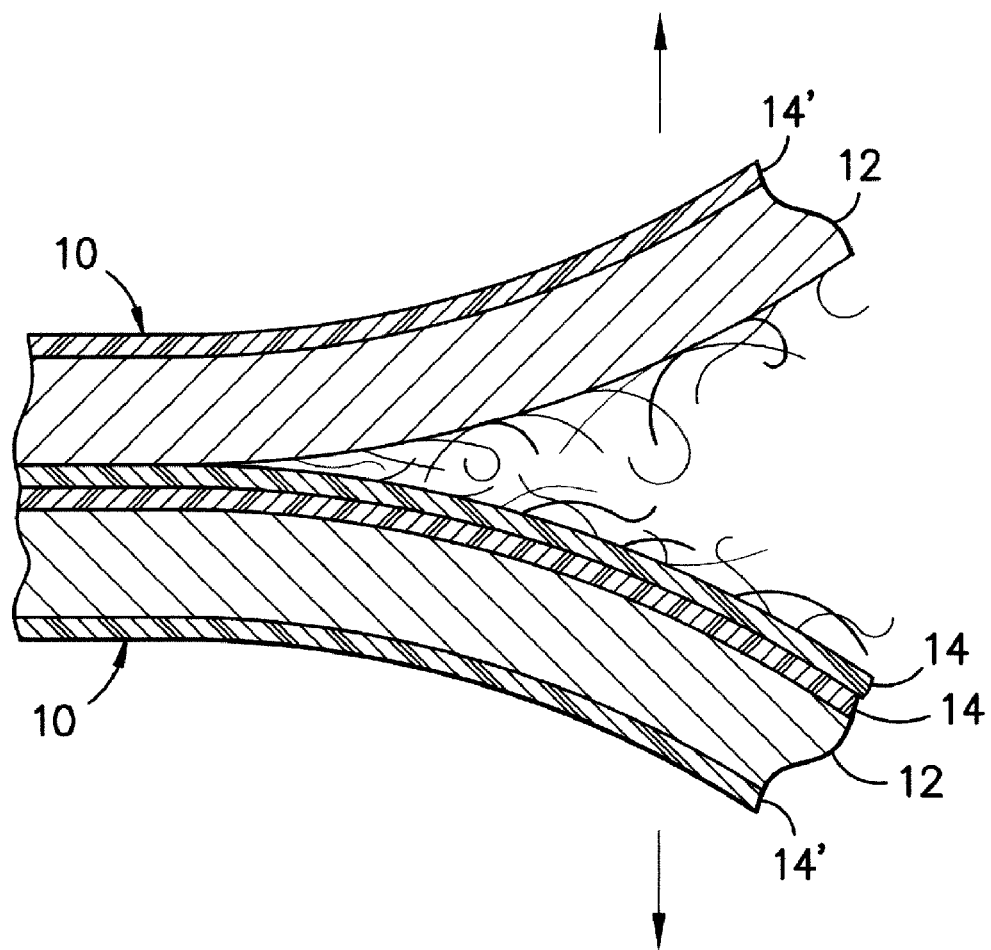
FIG. -17-

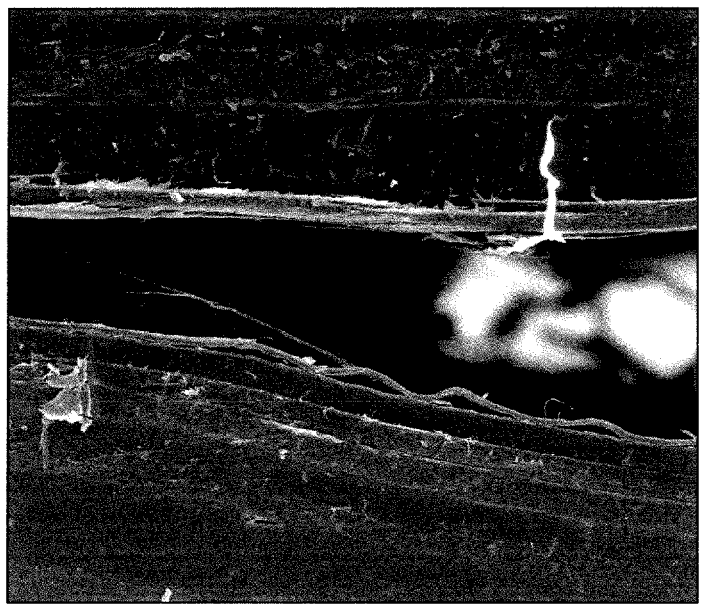
*FIG. -18-*
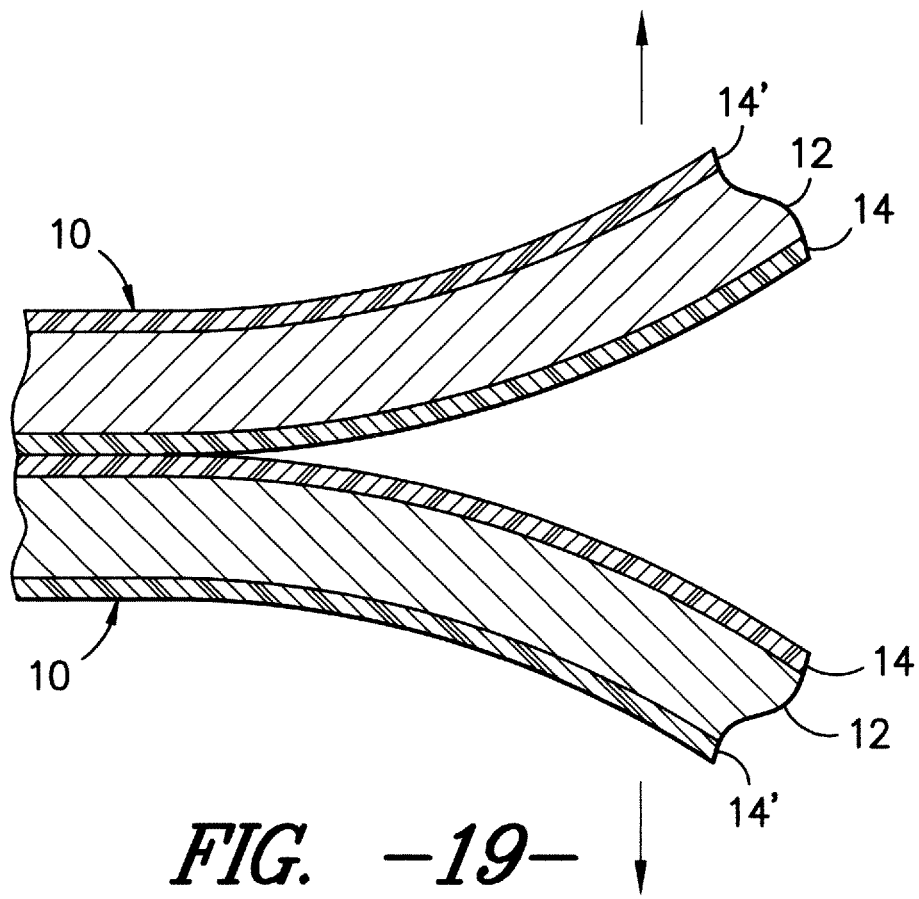
*FIG. -19-*

CONSOLIDATED FIBROUS STRUCTURE

RELATED APPLICATIONS

This application is a continuation of U.S. application Ser. No. 12/360,553, now U.S. Pat. No. 8,119,549 filed Jan. 27, 2009 entitled, "Consolidated Fibrous Structure"

TECHNICAL FIELD

The present application is directed to consolidated fibrous structures and fibrous layers making up the fibrous structures.

BACKGROUND

Consolidation of thermoplastic fibers into a fibrous structure such as the consolidation of polypropylene fibers for molded parts and other applications is typically accomplished by hot pressing under pressure at typically high temperatures (about 300° F. or more) and typically high pressures of (about 300 psi or more) to obtain consolidated fibrous structures having the desired performance attributes. The high temperature requirement hinders the ability to co-process the polypropylene fibers with other materials such as polymer fibers that are compromised at or above 250° F. The high pressure requirements prevent these materials from being processed in cost-effective autoclavable processes where the maximum application pressure is often about 45-100 psi. Due to the existing method of high temperature-high pressure consolidation, manufacturability of large parts requires large metal moulds which significantly add to the cost of the machinery and finished parts.

Thus, there is a need for high performance thermoplastic fibrous layers and structures that are able to be processed at lower temperatures, pressures, and/or dwell times while having the same or better performance characteristics than the prior art materials processed at much higher temperatures and pressures.

BRIEF SUMMARY

The present disclosure provides a consolidated fibrous structure of fibrous layers in cohesive adjoined relation.

According to one aspect, a consolidated fibrous structure comprising a multiplicity of fibrous layers is provided. Each fibrous layer contains fibers. The fibers of each fibrous layer contain a core and a skin layer. The core has an exterior surface portion containing polypropylene. The skin layer is disposed on at least a portion of the core and contains a first polymer and a second polymer. The first polymer contains a polymer having at least 70% α-olefin units and is characterized by a melting temperature lower than the melting temperature of the exterior surface portion of the core. The second polymer contains a co-polymer having at least 50% α-olefin units and is characterized by a number-average molecular weight of about 7,000 g/mol to 50,000 g/mol, a viscosity of between about 2,500 and 150,000 cP measured at 170° C., and a melting temperature lower than the melting temperature of the exterior surface portion of the core. The viscosity of the second polymer is not greater than 10% of the viscosity of the first polymer measured at 170° C. At least a portion of the skin layers of the fibers within each fibrous layer are fused to at least a portion of other skin layers of fibers within the same fibrous layer, at least a portion of the skin layers of the fibers of each fibrous layer are fused with at least a portion of the skin layers of the fibers in an adjacent fibrous layer, and the stiffness of the consolidated fibrous structure is at least 1 N-m measured by ASTM D 790.

BRIEF DESCRIPTION OF THE DRAWINGS

FIG. 1 illustrates schematically a cross-section of an exemplary consolidated fibrous structure.

FIG. 2 illustrates schematically a cross-section of an exemplary fiber of tape construction having a skin layer on one side of a core.

FIG. 3 illustrates schematically a cross-section of an exemplary fiber of tape construction having a skin layer on both sides of a core.

FIG. 4 illustrates schematically a cross-section of an exemplary fiber of tape construction having a skin layer on both sides of a core where the core has an inner portion and an exterior surface portion.

FIG. 5 illustrates schematically a cross-section of an exemplary fiber of circular cross-section having a skin layer surrounding a core.

FIG. 6 illustrates schematically a cross-section of an exemplary fiber of oval cross-section having a skin layer surrounding a core.

FIG. 7 illustrates schematically a cross-section of an exemplary fiber of oval cross-section having a skin layer surrounding a core where the core has an inner portion and an exterior surface portion of the core.

FIG. 8 illustrates schematically a cross-section of an exemplary fibrous layer having a woven construction.

FIG. 9 illustrates schematically a cross-section of an exemplary fibrous layer having a unidirectional construction.

FIG. 10 illustrates schematically a cross-section of an exemplary fibrous layer having a knit construction.

FIG. 11 illustrates schematically a cross-section of an exemplary fibrous layer having a non-woven construction.

FIG. 12 illustrates schematically a consolidated fibrous structure in a three-dimensional shape.

FIG. 13 illustrates schematically a cross-section of two fibrous layers consolidated together showing polymer at least partially filling the interstices of the fibrous layers.

FIG. 14 illustrates schematically a cross-section of an exemplary fibrous layer having a unidirectional construction where the fibers have one continuous skin layer and one discontinuous skin layer.

FIG. 15 illustrates schematically a cross-section of a fibrous layer showing 2 fibers fused together.

FIG. 16 is a 100× image of a fibrous layer as illustrated in FIG. 15 illustrating the peeling failure mode.

FIG. 17 is an illustrative version of the image of FIG. 16.

FIG. 18 is a 200× image of fibers peeled apart having the interface between the skin layer and the skin layer fail.

FIG. 19 is an illustrative version of the image of FIG. 18.

DETAILED DESCRIPTION

Referring now to FIG. 1, there is shown one embodiment of the consolidated fibrous structure 200 which is formed from three (3) fibrous layers 100. Each fibrous layer 100 contains fibers 10 having a core 12 with an exterior surface portion comprising polypropylene and skin layers 14 and 14' comprising a first polymer and a second polymer. The stiffness of the consolidated fibrous structure is at least about 1 N-m, more preferably at least 5 N-m measured by ASTM D 790.

FIGS. 2-7 illustrate different configurations of the fibers 10. For purposes of the present application, fiber is defined as an elongated body, the length at least 100× the square root of the cross-sectional area. Accordingly, the term "fiber" as used herein includes a monofilament elongated body, a multifilament elongated body, ribbon, strip, tape, and the like. The term fibers include a plurality of any one or combination of the above. FIG. 2 shows a fiber 10 having a tape construction with a core 12 and a skin layer 14 on one side of the core 12. FIG. 3 shows a fiber 10 being tape elements having a core 12 and two skin layers 14, 14' sandwiching the core 12. FIG. 4 illustrates an embodiment where the core has an inner portion 12" and an exterior surface portion 12' including polypropylene. The inner portion 12" may be, but is not limited to, polypropylene, polyethylene, polyester, polyamides, polyethers, or copolymers thereof; glass fiber, aramid, carbon fiber, ceramic fiber, nylon, polyetherimide, polyamide-imide, polyphenylene sulfide, polysulfones, polyimide, conjugated polymers, mineral fiber, natural fibers, metallic fiber or mixtures thereof. In one embodiment, the inner portion 12" of the core 12 has a tensile modulus of greater than 15 grams per denier as measured by ASTM method 3811-07. The inner portion 12" and exterior surface portion 12' of the core may be of the same or similar chemical composition or may be of different chemical composition with or without the use of surfactants, copolymers, or other means of reducing the surface energy difference between the inner portion 12" and exterior surface portion 12' of the core 12. In one embodiment, the fiber 10 is a high modulus fiber, being defined as fibers having a tensile modulus of greater than 10 grams per denier as measured by ASTM method 3811-07 and preferably have a tensile strength of at least 100 MPa.

FIG. 5 shows a fiber 10 being a fiber having a circular cross-section with a core 12 and a skin layer 14 surrounding the core. FIG. 6 shows a fiber 10 being a fiber having an oval or oblong cross-section having a core 12 and a skin layer 14 surrounding a section of the core, the skin layer 14 being discontinuous at least in the direction around the circumference of the core 12. FIG. 7 illustrates the embodiment where the core has an inner portion 12" and an exterior surface portion 12' being polypropylene. The exterior surface portion 12' of the core 12 may be continuous or discontinuous. The inner portion 12" may be, but is not limited to, polypropylene, polyethylene, polyester, polyamides, polyethers, or copolymers thereof; glass fiber, aramid, carbon fiber, ceramic fiber, nylon, polyetherimide, polyamide-imide, polyphenylene sulfide, polysulfones, polyimide, conjugated polymers, mineral fiber, natural fibers, metallic fiber or mixtures thereof. In one embodiment, the inner portion 12" of the core 12 has a tensile modulus of greater than 15 grams per denier as measured by ASTM method 3811-07. The inner portion 12" and exterior surface portion 12' of the core may be of the same or similar chemical composition or may be of different chemical composition with or without the use of surfactants, copolymers, or other means of reducing the surface energy difference between the inner portion 12" and exterior surface portion 12' of the core. The interface between the inner portion 12" and the exterior surface portion 12' should have sufficient physical interlocking as to prevent delamination between the inner portion 12" and the exterior surface portion 12' of the fiber 12 in the final product.

The core 12 of the fiber 10 has a high modulus (greater than 10 grams per denier) to provide stiffness for the fiber 10. It is contemplated that the core 12 of the fibers 10 is preferably made up of a molecularly-oriented thermoplastic polymer. The core 12 may account for about 50-99 wt. % of the fiber 10. Preferably, the core 12 of the fiber 10 has a tensile modulus of at least greater than 10 grams per denier as measured by ASTM method 3811-07, and more preferably greater than 40 grams per denier. According to one practice, the core 12 of the fiber 10 is polypropylene and is highly drawn with a draw ratio greater than 10:1. The core 12 (inner portion 12" and exterior surface portion 12') of fiber 10 has a peak melting temperature equal to or higher than the all the skin layers 14, 14'. Preferably, the core 12 (inner portion 12" and exterior surface portion 12') of the fiber 10 has a peak melting temperature of at least 5° F. greater than the skin layers 14, 14', more preferably at least 10° F. greater than the skin layers 14, 14'.

In one embodiment, the fibers 10 are tape elements having a core 12 and at least one skin layer 14, 14'. The tape fibers 10 may be formed by slitting a film. The film may be formed by any conventional means of extruding such multilayer polymeric films. By way of example, and not limitation, the film may be formed by blown film or cast film extrusion. The film is then cut into a multiplicity of longitudinal strips of a desired width by slitting the film to yield tape fibers 10 having cross-sections in the thickness dimension as shown in FIGS. 2-4. The tape fibers 10 are then preferably drawn in order to increase the orientation of the core 12 so as to provide increased strength and stiffness of the material. After the drawing process is complete, in one embodiment the resulting strips are in the range of about 1 to about 5 millimeters wide.

Fiber elements being tape elements, core-shell elements, and their textile layer constructions are believed to be more fully described in U.S. Patent Publication No. 2007/0071960 (Eleazer et al.), U.S. patent application Ser. No. 11/519,134 (Eleazer et al.), and U.S. Pat. No. 7,300,691 (Eleazer et al.), U.S. Pat. No. 7,294,383 (Eleazer et al.), and U.S. Pat. No. 7,294,384 (Eleazer et al.), each of which is incorporated by reference.

The core 12 (or exterior surface portion 12' of the core 12) is compatibly bonded to each of skin layers 14, 14' along their respective surfaces. The skin layers 14, 14' contain a first polymer and a second polymer. The skin layers 14, 14' may be continuous or discontinuous on the core 12. Preferably, the skin layers 14, 14' account for about 1-50 vol. % of the fiber 10. The core 12 and skin layer(s) 14, 14' may be co-extruded together, or the skin layer(s) layer 14, 14' may be applied to the core 12 after the core 12 has been formed. Additionally, a portion of the skin layer(s) may be applied during or after core formation with the balance of the skin layer(s) being introduced at a later point. The fiber 10 may be drawn or oriented before or after the skin layer(s) 14, 14' are formed in order to increase the orientation of the core 12 so as to provide increased strength and stiffness or achieve a targeted core dimension.

The first polymer comprises a polymer having at least about 70% α-olefin units and is compatible with the polypropylene of the exterior surface portion 12' of the core 12. Preferably, the first polymer is a co-polymer having at least about 70% α-olefin units. "Compatible", in this application, is defined as two or more polymers that are inherently or enhanced to remain mixed without objectionable separation over the range of processing conditions that will form the final product. "α-olefin", in this application, is defined as 1-alkene olefin monomer units other than ethylene such as propylene, butylene, 4-methyl-1-pentene, pentene, 1-octene, and the like.

It may be preferred for the first polymer to have an ethylene content of about 1-25 mol. %, and a propylene content of about 75-99 mol. %. It may be further preferred for the first polymer to have a ratio of about 95 mol. % propylene to about 5 mol. % ethylene. In one embodiment, the first polymer is a terpolymer, one example being a terpolymer of ethylene, propylene, and butylene. The first polymer has a viscosity of greater than 150,000 cP measured at 170° C. and a melting temperature lower than the melting temperature of the exterior surface portion of the core. In one embodiment, the first polymer has a viscosity of greater than 1,000,000 cP measured at 170° C. The first polymer has at least ten times the viscosity of the second polymer, measured at 170° C. In one embodiment, the first polymer has a melting temperature of between about 120 and 140° C., a weight average molecular weight of between about 300,000 and 350,000, a viscosity of about 4,000,000 to 7,000,000 cP at 170° C., a melt flow index of between about 4 and 8 grams/10 minutes measured at 230° C., and a polydispersity of between about 3 and 6. "Melting temperature", in this application, is defined to be the lower of the peak melting temperature or the temperature at which 50% of the polymer has melted from the solid state as measured by Differential Scanning calorimetry (DSC). Preferably, the first polymer as a melting temperature of at least about 10° C. lower than that of the exterior surface portion 12' of the core 12, and preferably between about 15-40° C. lower. In one embodiment, the tensile modulus of the first polymer is greater than about 100 MPa, preferably greater than about 500 MPa and most preferably greater than about 1 GPa.

The skin layer(s) 14, 14' also contain a second polymer. The second polymer comprises a co-polymer having at least 50% α-olefin units. Preferably, the second polymer comprises a co-polymer having at least 50% propylene units, more preferably 80% propylene units, most preferably more than 82% propylene units. The second polymer comprises a number-average molecular weight of between about 7,000 g/mol and 50,000 g/mol, a viscosity of between about 2,500 and 150,000 cP measured at 170° C., and a melting temperature lower than the melting temperature of the exterior surface portion of the core. The second polymer has a viscosity not greater than about 10% of the viscosity of the first polymer measured at 170° C. If the polymer has a number-average molecular weight lower than 7,000 g/mol or a viscosity lower than 2500 cP, the molecular chains of the second polymer are too short to entangle with one another and are too weak to effectively fuse with the first polymers. A polymer with a viscosity of greater than 150,000 cP has a reduced ability to flow into the interstices of the fibrous layers under lower temperature and pressure consolidation conditions. The melting temperature of the second polymer is preferably lower than the core in order to fuse the layers together without compromising the integrity of the core. In one embodiment, the second polymer has a weight average molecular weight of between about 20,000 and 40,000 g/mol, a number average molecular weight of between about 7,000 and 22,000.

In one embodiment, the viscosity of the second polymer is between about 4,000 and 120,000 cP measured at 170° C., more preferably between about 4,000 and 16,000 cP. In one embodiment, elongation at break is greater than about 200%, more preferably greater than about 400%. In one potentially preferred embodiment, the second polymer has a lower melting temperature than the first polymer. This aids in allowing the second polymer to flow into the interstices. In one embodiment, the second polymer has a cohesion strength of at least about 1 MPa, more preferably greater than about 4 MPa. Having a cohesion strength in this range provides a polymer that resists tearing. In one embodiment, the viscosity of the second polymer is between about 0.005 to 10% the viscosity of the first polymer measured at 170° C., more preferably about 0.1 and 10%. The large difference in viscosity is believed to help facilitate the structural adhesion between the first polymer and the core and the filling of the interstices of the fibrous layers by the second polymer. Generally it has been found that an increase in the molecular weight leads to an increase in the cohesion strength and the viscosity of the polymer. The first polymer provides the strength of the reinforcement and is expected to have a high molecular weight and hence a higher cohesion strength and viscosity. The second polymer aids in processing of the skin layer and also fills the interstices of the fibrous layers to provide additional reinforcement. In one embodiment, the tensile modulus of the second polymer is greater than about 0.1 MPa, preferably greater than about 0.5 MPa and most preferably greater than 1 MPa. The percentage by weight of the second polymer to the total weight of the fiber is between about 0.25% wt and 50% wt, more preferably between about 1% wt and 25% wt. In one preferred embodiment, the second polymer comprises a metallocene catalyzed propylene-ethylene co-polymer.

The skin layers 14, 14' have an interior margin adjacent the core 12 and an exterior margin in the skin layer 14, 14' remote from the core 12. The interior margin of the skin layer comprises the first polymer and the exterior margin of the skin layer comprises the second polymer. In some embodiments, the first polymer contributes significantly to the adhesion between the core and the skin layer and the second polymer contributes significantly to the adhesion of the skin layer to skin layer of adjacent fibers 10.

In one embodiment, the skin layers 14, 14' contain a generally homogenous blend of the first and second polymers. However, in one embodiment, the first and second polymers form concentration gradients through the thickness of the skin layer 14, 14'. The first polymer has a higher concentration at the inner margin, decreasing concentration through the skin layer to a lower concentration at the exterior margin of the skin layer. The second polymer forms a concentration gradient from a higher concentration at the outer margin decreasing through the thickness of the skin layer to the inner margin. Preferably, the first polymer is a majority component by weight of the skin layer 14, 14' at the inner margin and the second polymer is a majority component by weight of the skin at the exterior margin. This gradient may be formed, for example, by co-extruding the skin layer and core together having the second polymer bloom towards the surface of the skin layer or applying the first and second polymers as discrete layers then heating them to form one layer where a portion of the first polymer migrates into the second and a portion of the second polymer migrates into the first.

The fibers 10 are in fibrous layers 100. These fibrous layers 100 may contain fibers in woven, non-woven, knit, or unidirectional constructions (or mixtures of these constructions). Referring now to FIG. 8, there is shown fibers 10 in a woven construction. While the fibers 10 shown in FIG. 8 are tape fibers having a core 12 and two skin layers 14 and 14', other fiber types or shapes may be utilized. As illustrated, the fibrous layer 100 preferably includes a multiplicity of fibers 10 running in the warp direction interwoven with fibers 10 running in the fill direction in transverse relation to the warp fibers. As shown, the fill fibers are interwoven with the warp fibers such that a given fill extends in a predefined crossing pattern above and below the warp. In one embodiment, the fill fibers and the warp fibers are formed into a so called plain weave wherein each fill fiber passes over a warp fiber and thereafter passes under the adjacent warp fiber in a repeating manner across the full width of the fibrous layer 100. However, it is also contemplated that any number of other weave constructions as will be well known to those of skill in the art may likewise be utilized. By way of example only, and not limitation, it is contemplated that the fill fibers may pass over two or more adjacent warp fibers before transferring to a position below one or more adjacent warp fibers thereby forming a twill weave. The term "interwoven" is meant to include any construction incorporating interengaging formation fibers.

FIG. 9 illustrates a fibrous layer 100 having a unidirectional construction formed from a multiplicity of fibers 10 being tape elements. The fibers are aligned parallel along a common fiber direction of the fibrous layer 100. In one embodiment, the fibers 10 in the fibrous layer 100 do not overlap one another, and may have gaps between the fibers 10. In another embodiment, the fibers overlap one another up to 90% in the fibrous layer 100. One approach for aligning the fibers (especially tape elements) is to align the fibers into a sheet by pulling the fibers from a creel. Using a roll-off creel is helpful to reduce twist in the fibers. The common fiber direction of the fibers 10 in one fibrous layer 100 is the same (parallel to) as the common fiber direction of the fibers 10 of the adjacent fibrous layer. In the consolidated fibrous structure 200, the common fiber direction of the fiber 10 in one layer 100 may be parallel, perpendicular, or have any other rotational degree relative to the fiber direction in the adjacent fibrous layers 100.

FIG. 10 illustrates a fibrous layer 100 having a knit construction. The warp and weft fibers are circular cross-section fibers 10. There is also a stitching fiber 15 which may be the same as fiber 10 or may be another thermoplastic or non-thermoplastic fiber. The knit fibrous layer 100 may be any known knit, including, but not limited to circular knit, warp knit, weft-inserted warp knit, double needle bar, and jacquard knit fabrics.

FIG. 11 illustrates a fibrous layer 100 having a non-woven construction. The fibers 10 are tape fibers. The core 12 and skin layers 14 and 14' are not shown for simplicity. The term "non-woven" refers to structures incorporating a mass of fiber elements that are entangled and/or heat fused so as to provide a coordinated structure with a degree of internal coherency. Non-woven fibrous layers or webs may be formed from many processes such as for example, meltspun processes, hydroentangling processes, mechanically entangled processes, needle punched processes, air-laying processes and wet laying processes, laid scrims and the like.

In the fibrous layers, the fibers 10 may be unattached from one another or fused to one another. In the fused configuration, at least a portion of the skin layers 14, 14' of the fibers 10 within the fibrous layer 100 are fused to one another. The fibrous layer 100 is heated, preferably under pressure, to a softening temperature below that of the core 12. In so doing, the skin layers 14, 14' will melt while the core 12 will remain substantially solid and highly oriented. As the fibrous layer 100 then cools, the skin layers 14, 14' will fuse together, thereby forming a solid matrix. Fused or un-fused individual fibrous layers 100 may be stacked and reheated to form the consolidated fibrous structure 200.

At least 3 of the fibrous layers 100 are stacked together and consolidated using heat and/or pressure to form a consolidated fibrous structure 200 such as shown in FIG. 1. While the consolidated fibrous structure 200 has been depicted in FIG. 1 as including three (3) fibrous layers 100, those of ordinary skill in the art will readily appreciate that the consolidated fibrous structure 200 can comprise any suitable number of fibrous layers 100. In one embodiment, at least two (2) fibrous layers are consolidated together. In other embodiments, the consolidated fibrous structure 200 can comprise greater than three fibrous layers. By way of example only and not limitation, such structures may have ten fibrous layers, twelve fibrous layers, eighteen fibrous layers, twenty fibrous layers, thirty fibrous layers, or forty fibrous layers. While FIG. 1 shows each of the fibrous layers 100 containing the same type of fibers 10 and layer construction (woven in the case of FIG. 1), the consolidated fibrous structure 200 may contain many different fibrous layer 100 constructions and fibers 10 in the structure 200.

Several layers of fibrous layers 100 may be stacked in layered relation prior to the application of heat and pressure in order to form the consolidated fibrous structure 100. The layers of the fibrous layer 100 may be formed from a single sheet of a fibrous layer that is repeatedly folded over itself, or from several discrete overlaid fibrous layers. Alternatively, the structure 200 may be formed by reheating several previously fused fibrous layers 100. Any of these methods may be employed to form a structure 200 with any desired thickness or number of layers.

Consolidation of multiple fibrous layers 100 is preferably carried out at suitable temperature and pressure conditions to facilitate both interface bonding fusion and partial migration of the melted skin layer material between the layers. It has been found that having a both the first polymer and the second polymer in the skin layer aids in the ability to use lower temperature, lower pressure, and/or shorter dwell time consolidation conditions with the same or better properties as compared to a fiber having only a first polymer in the skin layer. Heated batch or platen presses may be used for multi-layer consolidation. In one exemplary practice, autoclaves or vacuum bags may be used to provide the pressure during consolidation. Continuous consolidation methods such as calendaring or use of a single or double belt laminator may likewise be employed. It is contemplated that any other suitable press may likewise be used to provide appropriate combinations of temperature, pressure, and residence time. According to a potentially preferred practice, heating is carried out at a temperature of about 195-325° F. and a pressure of about 15-400 psi. When exposed to such an elevated temperature and pressure, the skin layers 14, 14' will melt while the core 12 will remain substantially solid. Upon cooling, the skin layers 14, 14' will fuse thereby forming a matrix through which the stiff core 12 are distributed. "Fuse" is defined as being joined as if by melting together. At least a portion of the skin layers of the fibers 10 in each fibrous layer 100 are fused within the same fibrous layer 100 and at least a portion of the skin layers of the fibers 10 of each fibrous layer 100 are fused with at least a portion of the skin layers 14, 14' of the fibers 10 in an adjacent fibrous layer 100.

According to a potentially preferred practice, cooling is carried out under pressure to a temperature lower than about 100° F. It is contemplated that maintaining pressure during the cooling step tends to inhibit shrinkage of the core and ensures no loss of consolidation. Without being limited to a specific theory, it is believed that higher pressures may facilitate polymer flow at lower temperatures. Thus, at the higher end of the pressure range, (greater than about 200 psi) the processing temperature may be about 80-140° C.

The consolidated fibrous structure 200 may thereafter be subjected to three-dimensional molding under heat and pressure at temperatures above the softening point of the skin layers 14, 14' so as to yield complex shapes. The fibrous structures may also be consolidated and molded in a single step forming structure 200 simultaneous with the formation of a subtle or complex shape. An example of a plurality of fibrous layers 100 formed into a consolidated fibrous structure 200 having a three-dimensional shape is shown in FIG. 12.

In one embodiment, the fibrous layers 100 contain interstices 22, or voids, between the fibers as shown, for example, in FIG. 13. It has been found that the second polymer is more mobile during the fusing process and more easily migrates into the interstices 22 of the fibrous layer 100. In some embodiments, there are also interstices formed between fibers of adjacent fibrous layers. Preferably, when the interstices are at least partially filled with the first and second polymer, the filled interstices contain at least about 80% by weight the second polymer. At least partially filling the interstices 22 of the fibrous layers 100 creates better adhesion between the fibrous layers 100 and a better performing end product.

In some embodiments, during consolidation of the fibrous layers 100 or structures 200, a portion of the second polymer and first polymer intermix forming a blend of the first and second polymers.

Semicrystalline polymers like the polyolefins involved in this patent comprise oriented crystallites separated by amorphous chains. During the melt-welding of polyolefins, especially polypropylene, the amorphous chains migrate towards the interface to maximize the entropy. Due to the accumulations of short amorphous chains, the strength of the interface can be very weak. In one embodiment, the first polymer and second polymer can be found to co-crystallize with one another resulting in a polymer blend with a higher crystallinity than either polymer alone. The complementary crystallization is believed to enhance the physical properties of the skin yielding an improved skin layer. This is achieved through the second polymer increasing the mobility of the first polymer chains and allowing a more extensive crystallization. The second polymer, being compatible with the first, is also able to incorporate into the crystal structure of the first without the introduction of significant additional defects.

While not being bound to any theory, it is believed that typically, if a mixture of two polymers is melted and cooled one would expect the crystallinity to be a simple average rule of mixtures. However, if a lower molecular weight species (preferably metallocene polyolefins) is present at the interface, the shorter molecular chains co-crystallize with the amorphous chains at the interface. In this case the final crystallinity of the polymer mixture is higher than either of the two polymers. In the preferred embodiment the crystallinity of the heated-cooled mixture of the skin layer is higher than any of the two polymers separately. This co-crystallization phenomenon imparts great strength to the interface between the skin layers 14, 14'. The degree of co-crystallization is dependent on the molecular chain length of the amorphous segments of the first polymer and on the crystallizable chain length of the second polymer. Another phenomenon that could control the degree of co-crystallization is the rate of cooling. The rate of cooling is dependent on the consolidation conditions.

The skin layers 14, 14 may be applied to the core 12 of the fibers 10 in any known method. The skin layers may be co-extruded or otherwise formed at the same time as the core of the fibers or may be applied to a core after the core are formed. The skin layers 14, 14' may be applied to individual cores or onto cores that have already been formed into a fibrous layer. The skin layers may be continuous or discontinuous. FIG. 14 illustrates a fibrous layer 100 being a unidirectional layer having a continuous skin layer 14 on one side of core and a discontinuous skin layer 14' on the opposite side of the core. These discontinuous regions may be along a single fiber 10 or across multiple fibers 10. This application may be conducted by any known means including, but not limited to, solvent coating, curtain coating, extrusion coating, inkjet printing, gravure printing, solvent coating, powder coating, covering the core with a spunbond skin layer, or covering the core with a separate film layer comprising the skin polymers.

One contemplated practice to form multi-layered fiber comprises providing an elongated core having an exterior surface portion comprising polypropylene and applying a skin layer to at least a portion of the core, where the skin layer comprises a first polymer and a second polymer. In one embodiment, the first polymer contains a co-polymer having at least 70% α-olefin units and is characterized by a viscosity of greater than 1,000,000 cP measured at 170° C. and a melting temperature lower than the melting temperature of the exterior surface portion of the core. The second polymer contains a propylene co-polymer having at least 80% propylene units and is characterized by a number-average molecular weight of about 7,000 g/mol to 50,000 g/mol, a viscosity of between about 4,000 and 10,000 cP measured at 170° C., and a melting temperature lower than the melting temperature of the first polymer. In this embodiment, the ratio by weight of the second polymer to the first polymer is between about 1:20 to 20:1.

How well the consolidated fibrous layer performs can be evaluated by testing stiffness and peel strength (both of which are described in detail in the examples section). During the peel test, the fiber-fiber unit fails either at the core-skin layer interface or the skin layer-skin layer interface.

A section of the consolidated fibrous structure has two interfaces as shown in FIG. 15. The core-skin layer adhesion is fixed by the method at which the skin layer was applied to the core (for example, co-extruded or coated on). When the skin layer contains the first and second polymers, the skin layer-skin layer interface is strong resulting in a failure between the core and the skin layer or within the core itself. This indicates a very strong bond between the skin layers. This can be seen in the 100× micrograph of FIG. 15. An illustration of the image is shown in FIG. 17. One is able to determine where in the structure the failure mode happened by the appearance, or lack thereof, of oriented fibers at the split. These oriented fibers are parts of the oriented core stripping away from the core.

If the skin layer-skin layer cohesion is not stronger than the core-skin layer adhesion, the failure will occur between the skin layers and resulting in a smooth split as can been seen in the 200× micrograph of FIG. 18 and as an illustration of the micrograph in FIG. 19. This indicates a poor bond between the fibers within fibrous layers or between fibrous layers. The skin layer-skin layer adhesion may be influenced by various material and processing parameters.

The fibrous layers 100 and consolidated fibrous structure 200 may contain additional fibers or layers. Examples of additional fibers that may be incorporated include, but are not limited to fibers made from highly oriented polymers, such as gel-spun ultrahigh molecular weight polyethylene fibers, melt-spun polyethylene fibers, melt-spun nylon fibers, melt-spun polyester fibers, sintered polyethylene fibers, rigid-rod polymers, carbon fibers, aramid fibers, glass fibers, polylactic acid fibers, and natural fibers such as cotton.

Additional films such as polycarbonate films, polyester films, polyethylene films, and polypropylene films may be included into the structure 200. In some embodiments, additional panels may be included with the structure 200 such as ballistics panels or the like.

The fibers, fibrous layers, and consolidated fibrous structures may be used for many purposes in many different applications that would be unavailable to fibers having a core and a skin having only the first polymer. Having the skin layer contain both the first polymer and the second polymer allows for the same or better performance of the element or structure as fibers with only the first polymer, but processed at much lower temperatures, pressures, and/or dwell times.

EXAMPLES

Various embodiments are shown by way of the Examples below, but the scope of the invention is not limited by the specific Examples provided herein.

Test Methods

Stiffness was measured by ASTM D 790. For the peel strength test, the areal density of the specimen is adjusted to 0.21 psf (Typically 10 layer consolidated stacks are used). The samples are cut to 2" width strips. The peel specimens are prepared by leaving a 1" wedge at one end in the center of the stack (between layers 5 and 6) to grip the ends using fixtures mounted on the cross-head of an Instron. A 180 degree peel test is conducted with a crosshead speed fixed at 12"/min. The initial gauge length is 1". The peel start point is 1" and the end point is 9". The peel strength is calculated by measuring the average peel force divided by the sample width. Melting temperatures were measured by DSC using a scanning rate of 20° C./min.

Control Example 1

Woven fibrous layers were formed from monolayer polypropylene tape fibers in a plain weave with a fabric weight of 0.3 lb/yd$^2$. Ten (10) fiber layers were cut to a foot square (12"×12") and stacked. The layers were placed between two aluminum platens consolidated at various temperatures (T=320° F., 300° F.) and pressures (P=2500 psi, 300 psi) for 10 minutes of heating time. The sample was then subsequently cooled to 100° F. The cooling rate was approximately 20° F./minute.

Working Example 1

Woven fibrous layers were formed as described in Control Example 1. A propylene copolymer having Mw of 280,000 g/mol, vicat softening point of 107° C., a melting temperature of bout 117° C., and viscosity of 5,700,000 cP at 170° C. together with Licocene® 2602, a metallocene type of propylene-ethylene co-polymer obtained from Clariant were in dissolved at 80° C. in toluene under continuous stirring to give a uniform solution comprising 2% of each component (by weight; total weight of solids=4%). Licocene® 2602 had a viscosity of 6000 cP measured at 170° C. and a melting temperature of 75° C. The tensile modulus of Licocene® 2602 is measured to be approximately 0.7 MPa; has an elongation at break of 760% and cohesion strength of 9 MPa. The crystallinity of the polymer is ~17%.

The coating solution was padded on uniformly onto ten 12"×12" woven tape layers. The percent add-on on the fibrous layers was approximately 2% dry add on. The layers were then dried overnight at room temperature. After drying the woven tape fibrous layers they were stacked and consolidated by being placed between heated aluminum platens at a temperature of 300° F. and a pressure of 300 psi for 10 minutes of heating time. The sample was then subsequently cooled to 100° F. The cooling rate was approximately 20° F./minute.

Working Example 2

Woven fibrous layers were formed as described in Control Example 1. Dow® 6D83K (a propylene-ethylene random copolymer) obtained from Dow was melted at 225° C. in the melt bath of a film blowing line. Dow 6D83K had a weight average molecular weight of 360,000 and a melting temperature of 140° C. 25 micron thick films were blown and cut into 12"×12" sheets. Next, they were padded with a solution of a 2% wt Licocene® 2602, a metallocene type of propylene-ethylene co-polymer obtained from Clariant in toluene solution. Licocene® 2602 had a viscosity of 6000 cP measured at 170° C. and a melting temperature of 75° C. The tensile modulus of Licocene® 2602 is measured to be approximately 0.7 MPa; has an elongation at break of 760% and cohesion strength of 9 MPa. The crystallinity of the polymer is ~17%. These treated films were layered in between each of 10 woven fibrous layers of Control Example 1. It is believed that the coated film formed one layer. The stack was then placed between two platens at a temperature of 300° F. and a pressure of 300 psi for 10 minutes of heating time. After this the cooling cycle was started and the composite was removed when the temperature was 100° F.

Working Example 3

Woven fibrous layers were formed as described in Control Example 1. A propylene copolymer having Mw of 280,000 g/mol, vicat softening point of 107° C., a melting temperature of about 117° C., and viscosity of 5,700,000 cP at 170° C. together with Vestoplast® 708, a co-polymer obtained from Evonik Degussa Corporation were in dissolved at 80° C. in toluene under continuous stirring to give a uniform solution comprising 2% of each component (by weight; total weight of solids=4%). The Vestoplast® 708 had a number average molecular weight of 11,500 g/mol, a viscosity of 8,000 cP measured at 170° C., and a melting temperature of 56° C.

The coating solution was padded on uniformly onto ten 12"×12" woven tape layers. The percent add-on on the fibrous layers was approximately 2% dry. The layers were then dried overnight at room temperature. After drying the woven fibrous layers they were stacked and consolidated by being placed between heated aluminum platens at a temperature of 300° F. and a pressure of 300 psi for 10 minutes of heating time. The sample was then subsequently cooled to 100° F. The cooling rate was approximately 20° F./minute.

Results

TABLE 1

Peel Strength of Examples

| Example | Peel Strength when consolidated at a temp of 320° F. and a pressure of 2,500 psi | Peel Strength when consolidated at a temp of 300° F. and a pressure of 300 psi |
| --- | --- | --- |
| Control Ex. 1 | 2.0 lb/in | No consolidation |
| Working Ex. 1 | — | 5.5 lb/in |
| Working Ex. 2 | — | 3.2 lb/in |
| Working Ex. 3 | — | 5.7 lb/in |

A peel strength of "No consolidation" indicates that fibrous layers did not hold together well enough to perform the peel strength test.

Working Examples 1 and 3 had at least 85% greater peel strength processed at lower conditions (300° F., 300 psi) than Control Example 1 processed at much higher conditions (320° F., 2,500 psi). Control Example 1 would not even consolidate at the lower temperatures and pressures. Additionally, stiffness was measured for all samples and the Working Examples were at least as stiff as or stiffer than the Control Examples processed at the same conditions.

Having a skin layer containing a first polymer and a second polymer enables the working examples to be consolidated at much lower temperatures, pressures and/or dwell time saving time and energy over prior art materials.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A consolidated fibrous structure comprising at least two (2) fibrous layers, wherein each fibrous layer comprises tape fibers, wherein the tape fibers comprise:

a core comprising polypropylene;

a skin layer disposed on at least a portion of the core, wherein the skin layer comprises a polymer, wherein the polymer comprises a co-polymer having at least 50% α-olefin units and is characterized by a number-average molecular weight of about 7,000 g/mol to 50,000 g/mol, a viscosity of between about 2,500 and 150,000 cP measured at 170° C., and a melting temperature lower than the melting temperature of the core;

wherein at least a portion of the skin layers of the fibers in each fibrous layer are fused to at least a portion of other skin layers of fibers within the same fibrous layer, at least a portion of the skin layers of the fibers of each fibrous layer are fused with at least a portion of the skin layers of the fibers in an adjacent fibrous layer.

2. The consolidated fibrous structure of claim 1, wherein the tape fibers are high modulus fibers defined as having a tensile modulus of greater than 10 grams per denier.

3. The consolidated fibrous structure of claim 1, wherein the percentage by weight of the polymer to the consolidated fibrous structure is between about 0.25 and 50%.

4. The consolidated fibrous structure of claim 1, wherein the polymer has a propylene content of greater than 80% by mole.

5. The consolidated fibrous structure of claim 1, wherein each of the fibrous layers comprises interstices between the tape fibers and wherein the at least a portion of the interstices are filled by the polymer.

6. The consolidated fibrous structure of claim 1, wherein the consolidated fibrous structure comprising two (2) fibrous layers.

7. The consolidated fibrous structure of claim 1, wherein the polymer has an elongation at break of greater than about 200%.

8. The consolidated fibrous structure of claim 1, wherein the polymer has an elongation at break of greater than about 400%.

9. The consolidated fibrous structure of claim 1, wherein the fibrous layers are woven.

10. The consolidated fibrous structure of claim 1, wherein the stiffness of the consolidated fibrous structure is at least 1 N-m measured by ASTM D 790.

* * * * *